(12) United States Patent
Scotti et al.

(10) Patent No.: US 10,378,598 B2
(45) Date of Patent: Aug. 13, 2019

(54) PROTECTIVE SHEATHINGS FOR DISC BRAKE PISTON-CYLINDER UNITS

(75) Inventors: Fabio Scotti, Bonate Sotto (IT); Antonio Gotti, Almenno San Bartolomeo (IT); Armando Puddu, Terno D'Isola (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 166 days.

(21) Appl. No.: 13/808,256

(22) PCT Filed: Jul. 5, 2011

(86) PCT No.: PCT/IB2011/052968
§ 371 (c)(1),
(2), (4) Date: Apr. 19, 2013

(87) PCT Pub. No.: WO2012/004740
PCT Pub. Date: Jan. 12, 2012

(65) Prior Publication Data
US 2013/0192936 A1  Aug. 1, 2013

(30) Foreign Application Priority Data

Jul. 5, 2010 (IT) .............................. MI2010A1233

(51) Int. Cl.
| | |
|---|---|
| F16D 65/00 | (2006.01) |
| F16D 55/228 | (2006.01) |
| F16J 3/02 | (2006.01) |
| F16J 3/04 | (2006.01) |
| F16D 65/18 | (2006.01) |
| F16J 15/52 | (2006.01) |

(Continued)

(52) U.S. Cl.
CPC ......... *F16D 65/005* (2013.01); *F16D 55/228* (2013.01); *F16D 65/00* (2013.01); *F16D 65/0068* (2013.01); *F16D 65/18* (2013.01); *F16J 3/02* (2013.01); *F16J 3/042* (2013.01); *F16J 15/52* (2013.01); *F16D 2121/04* (2013.01); *F16D 2125/06* (2013.01)

(58) Field of Classification Search
CPC .... F16D 65/005; F16D 2121/04; F16D 65/18; F16D 65/0068; F16J 15/52
USPC .......................................................... 92/168
See application file for complete search history.

(56) References Cited

U.S. PATENT DOCUMENTS 2,254,937 A  *  9/1941  Burns ................... B60T 11/165
                                                              60/588
3,432,010 A      3/1969  Hemus
3,478,650 A  * 11/1969  Schrader ......................... 92/168
(Continued)

FOREIGN PATENT DOCUMENTS

DE  3128996 A1  2/1983
DE  4240061 A1  6/1994
(Continued)

*Primary Examiner* — Xuan Lan Nguyen
(74) *Attorney, Agent, or Firm* — Merchant & Gould P.C.

(57) ABSTRACT

Flexible sheathing for the protection of piston-cylinder units for disc brakes are provided. Such flexible sheathing may be arranged in a retracted condition wherein the piston is completely accommodated within the cylinder and in an extended condition wherein the piston is completely extracted from a caliper body defining the cylinder. Pistons incorporating such flexible sheathings and calipers incorporating such pistons are also provided.

9 Claims, 7 Drawing Sheets

(51) Int. Cl.
  *F16D 121/04*  (2012.01)
  *F16D 125/06*  (2012.01)

(56) References Cited

U.S. PATENT DOCUMENTS

| | | | | |
|---|---|---|---|---|
| 3,497,038 | A * | 2/1970 | Anders et al. | 188/370 |
| 3,502,004 | A * | 3/1970 | Schrader | 92/129 |
| 3,528,301 | A * | 9/1970 | Wasmer | 74/18.2 |
| 3,535,942 | A * | 10/1970 | Kateb | 74/18.2 |
| 3,592,299 | A * | 7/1971 | Erdmann | 188/71.9 |
| 3,848,705 | A | 11/1974 | Burnett | |
| 4,121,845 | A * | 10/1978 | Reynolds et al. | 277/634 |
| 4,248,329 | A * | 2/1981 | Torigoe | 188/264 G |
| 4,428,462 | A | 1/1984 | Warwick et al. | |
| 4,431,090 | A * | 2/1984 | Kinoshita | 188/264 G |
| 4,524,677 | A | 6/1985 | Ashman et al. | |
| 4,537,289 | A | 8/1985 | VonGrunberg et al. | |
| 4,809,821 | A | 3/1989 | Fulmer | |
| 5,048,648 | A * | 9/1991 | Le Deit | 188/370 |
| 7,097,004 | B2 * | 8/2006 | Barrett et al. | 188/72.4 |
| 2004/0026194 | A1 | 2/2004 | Cortinovis | |

FOREIGN PATENT DOCUMENTS

| | | | |
|---|---|---|---|
| EP | 0366505 | A2 | 5/1990 |
| EP | 1340001 | B1 | 4/2004 |
| JP | 60067434 | U | 5/1985 |
| JP | 139047 | A | 6/2007 |
| JP | 169955 | A | 7/2008 |

* cited by examiner

PROTECTIVE SHEATHINGS FOR DISC BRAKE PISTON-CYLINDER UNITS

CROSS-REFERENCE TO RELATED APPLICATIONS

This application is a National Phase Application of PCT International Application No. PCT/IB2011/052968, International Filing Date, Jul. 5, 2011, claiming priority to Italian Patent Application No. MI2010A001233, filed Jul. 5, 2010, both of which are hereby incorporated by reference in their entirety.

FIELD OF THE INVENTION

The present invention relates to flexible sheathing, which are also designated as dust covers, for protecting piston-cylinder units that can be used in disc brakes.

BACKGROUND OF THE INVENTION

Generally, in a disc brake the braking action is produced by piston-cylinder units provided in a suitable caliper and comprising a cylinder in which a piston can slide such as to be capable of acting by means of pads on opposite surfaces of a rotating disc.

Typically, the piston-cylinder unit is provided with a flexible sheathing for protecting the cylinder and piston (particularly, the sliding surfaces thereof) from the infiltration of external material and/or corrosive agents, such as dust, dirt, moisture which may prevent the piston from properly sliding within the cylinder during a braking action and/or give rise to the corrosion of the sliding surfaces of the piston and cylinder.

The flexible sheathing currently used are bellows-shaped and are applied to the piston-cylinder unit by fixing an end thereof about the piston and an opposite end about the cylinder such as to provide a protecting barrier that envelopes the piston-cylinder unit at the cylinder opening.

When the flexible protective sheathing is in a rest condition or when it is installed in a disc brake in which the piston is completely within the cylinder, such as happens for pads that are not worn up, it adopts a configuration according to which several portions thereof are wrapped on each other such as to provide one or more loops or folds. It should be noted that when the flexible sheathing is installed on a disc brake, these folds have convexities facing the pad and, particularly, facing a support plate of a friction gasket of the pad. As a result of the wear of the pad friction gaskets, the piston extends towards the disc and the flexible sheathing is elongated to adapt itself to the new position taken by the piston.

It is known that, in order to be capable of providing a disc brake with a flexible protective sheathing, a suitable seat is required to accommodate the sheathing and particularly the folds thereof when it is in a retracted condition for example in non-worn-up pad conditions in which the piston is entirely accommodated within the cylinder.

It is also known that the arrangement of this seat at the interface of cylinder, piston, pads causes an increase in the overall dimensions because, with the brake caliper dimensioning being equal, a suitable clearance is required to be left between the pads and the piston when the latter is entirely accommodated within the cylinder and also a side housing between piston and cylinder. Thereby, the total overall dimensions of the brake caliper is increased to ensure the same performance of the caliper by providing the housing for the flexible protective sheathing.

From EP 1 340 001 patent it is known to keep a suitable spacing between cylinder and pads such as to accommodate the protective sheathing in this space when the latter is retracted.

Thereby, an increase in the overall dimensions of the brake caliper is required such that this housing can be arranged within the caliper.

As it is known from U.S. Pat. No. 4,809,821 patent, a suitable annular groove can be provided proximate to the cylinder and piston head for the folds forming the flexible sheathing to be accommodated therein.

However, it is observed that this solution can weaken the resisting section of the cylinder and accordingly of the caliper body thereby reducing the stiffness and hence the performance thereof in general.

In U.S. Pat. No. 4,524,677 patent, a solution is proposed which is similar to the solution proposed by U.S. Pat. No. 4,809,821 in which the flexible sheathing is accommodated within an annular seat provided within the caliper body.

However, also in this case, the housing is provided to the detriment of material making up the caliper body thereby resulting in a reduction in the mechanical characteristics of the assembly, for example the stiffness thereof.

SUMMARY OF THE INVENTION

The problem at the heart of the present invention is to propose a housing for the flexible sheathing for protecting a piston-cylinder unit that can be used in a disc brake which does not have the drawbacks mentioned above with reference to the prior art.

In agreement with a general embodiment, a flexible sheathing for the protection of a piston-cylinder unit for a disc brake is capable of being arranged in a retracted condition wherein the piston is entirely accommodated within the cylinder and in an extended condition wherein the piston is completely extracted from a caliper body defining the cylinder, said piston having a piston outer surface suitable to co-operate with a cylinder inner surface of the caliper body which accommodate the piston, said outer surface having a predefined piston diameter and said cylinder inner surface having a predefined cylinder diameter, wherein said piston comprises a piston body and a head thereof suitable to press against a pad of the disc brake, this sheathing comprises:

a sheathing body, which in the retracted condition takes a substantially disc-shaped configuration which develops from an inner diameter to an outer diameter;

said outer diameter being greater than said cylinder diameter;

said inner diameter being smaller than the piston diameter and defining a sheathing portion extending from said inner diameter to said piston diameter;

a first hooking ring arranged along the sheathing outer diameter suitable to be fixed to a caliper body;

a second hooking ring arranged along the inner diameter of the sheathing suitable to be fixed to a piston;

a plurality of folds formed from folds defined by portions of said sheathing body which are folded such as to have the surfaces thereof directly facing each other and suitable to allow the extension of the sheathing during the outward movement of the piston from the caliper body cylinder.

Preferably, said plurality of folds is entirely arranged on said sheathing portion which extends from the inner diameter to the piston diameter.

In agreement with a general embodiment, a disc brake piston is suitable to be accommodated by a caliper body cylinder of the disc brake such as to be suitable to press against a braking pad, said piston having a piston outer surface suitable to co-operate with a cylinder inner surface of the caliper body which accommodates the piston, said outer surface having a predefined piston diameter and said cylinder inner surface having a predefined cylinder diameter, wherein said piston comprises a piston body and a head thereof suitable to press against the pad, the piston comprises:

a sheathing housing arranged on the piston head having housing walls and a first opening suitable to directly face the cylinder and a second opening suitable to directly face the breaking pad, said piston being suitable to be associated with a sheathing having a plurality of folds which are formed by portions of said sheathing that are folded such that the surfaces thereof directly face each other and such as to allow sheathing extension during the outward movement of the piston from the caliper body cylinder.

Preferably, this sheathing housing is suitable to entirely accommodate said plurality of folds of the sheathing.

In agreement with a general embodiment, a caliper for a disc brake comprises a piston accommodated within a caliper body cylinder of the disc brake such as to be capable of pressing on a braking pad, said piston having a piston outer surface co-operating with an inner surface of the caliper body cylinder which accommodate the piston, said outer surface having a predefined piston diameter and said cylinder inner surface having a predefined cylinder diameter, wherein said piston comprises a piston body and a head thereof which can press against the pad, the caliper comprises:

a sheathing housing arranged on the piston head which has housing walls and a first opening that directly faces the cylinder and a second opening that directly faces the braking pad, said piston being associated with a sheathing having a plurality of folds which are formed by portions of said sheathing that are folded such as to have their surfaces directly facing each other and such as to allow the sheathing extension during the outward movement of the piston from the caliper body cylinder, Preferably, this sheathing housing entirely accommodates said plurality of folds of the sheathing, thereby avoiding the requirement of a housing for the plurality of folds being provided within the caliper body.

Further features and advantages of the invention will become apparent from the detailed description and reference to the appended drawings briefly described below.

DETAILED DESCRIPTION

In agreement with a general embodiment, a flexible sheathing 100 for protecting a piston-cylinder unit for a disc brake which can be arranged in a retracted condition and in an extended condition, comprises:

a sheathing body 100, developing from an un inner diameter Di to an outer diameter De and defines an axial direction I-I, a radial direction—orthogonal to the axial direction—and a circumferential direction.

In agreement with an embodiment, said sheathing body comprises a first hooking ring 101 that is arranged along the outer diameter De of the sheathing 100 which projects in the axial direction and is suitable to be fixed to a caliper body 4.

In agreement with an embodiment, said sheathing body comprises a second hooking ring 102 arranged along the inner diameter Di of the sheathing 100 that projects in the axial direction and is suitable to be fixed to a piston 10.

In agreement with an embodiment, said sheathing body comprises a sheathing portion Pg extending from said inner diameter Di.

In agreement with an embodiment, said sheathing body comprises a plurality of folds 114 separated from said second hooking ring 101 and formed by folds being defined by portions of said sheathing body and folded such that the surfaces thereof directly face each other and such as to allow the sheathing 100 to extend during the outward movement of the piston 10 from the cylinder 9 of the caliper body 4. Said plurality of folds (114) is totally arranged on said sheathing portion Pg that extends from the inner diameter (Di).

In agreement with an embodiment, said sheathing body comprises a joining band 115 connecting the first hooking ring 101 to the plurality of folds 114. Advantageously, said joining band 115 substantially extends while remaining flat with the retracted gasket or substantial extends in the radial direction in the manner of a disc.

In agreement with an embodiment, the plurality of folds 114 extends in the radial direction by a predetermined first extension or radial extension of folds.

In agreement with an embodiment, the joining band 115 extends in the radial direction by a predefined or second extension or radial extension of joining band.

In agreement with an embodiment, said predetermined second extension results to be equal to or greater than said predefined first extension.

In agreement with an embodiment, said plurality of folds 114 extends in the axial direction I-I by a predefined third extension or axial extension of folds.

In agreement with an embodiment, said first hooking ring 101 extends in the axial direction I-I by a predefined fourth extension or axial extension of first hooking ring.

In agreement with an embodiment, said predetermined fourth extension results to be greater than or equal to said predetermined third extension.

Figure 1:
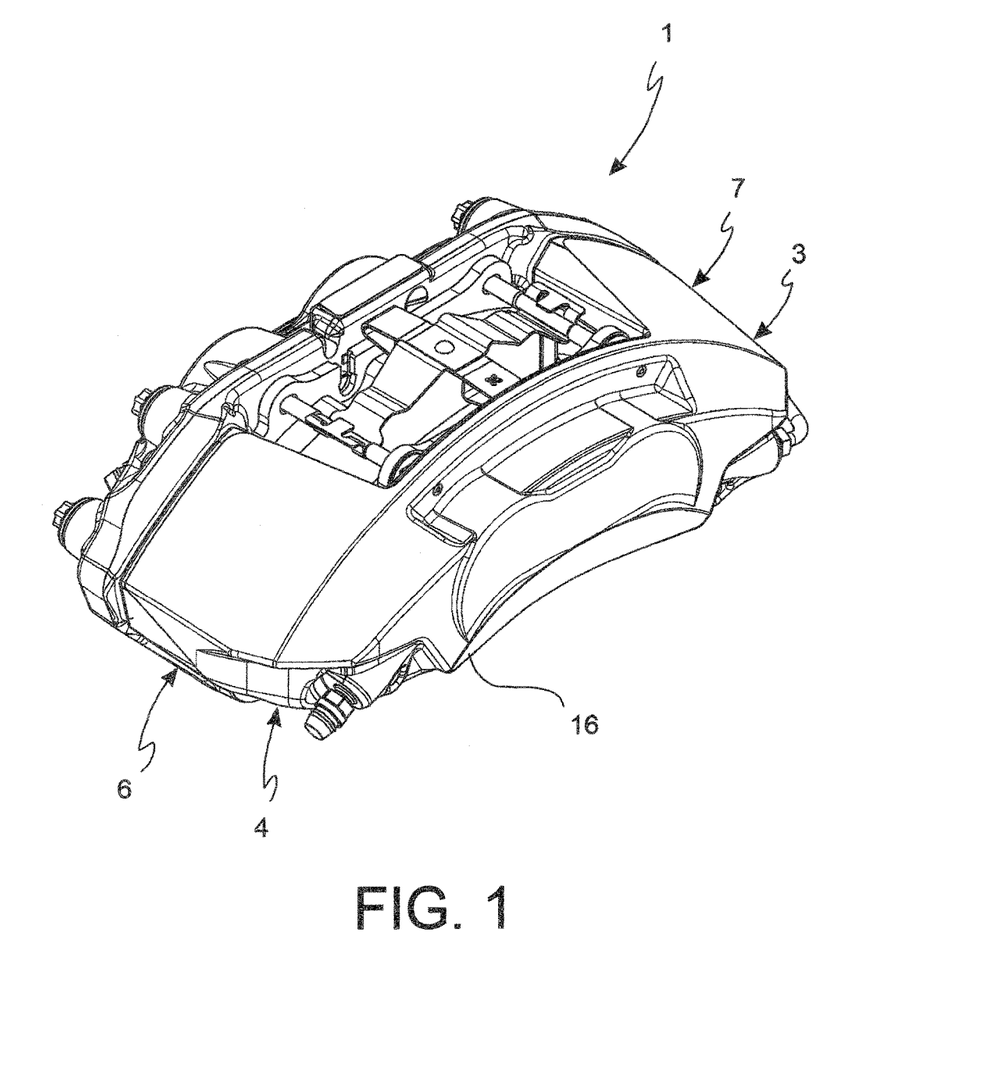
FIG. 1 is an axonometric view of a disc brake according to the invention.
Figure 2:
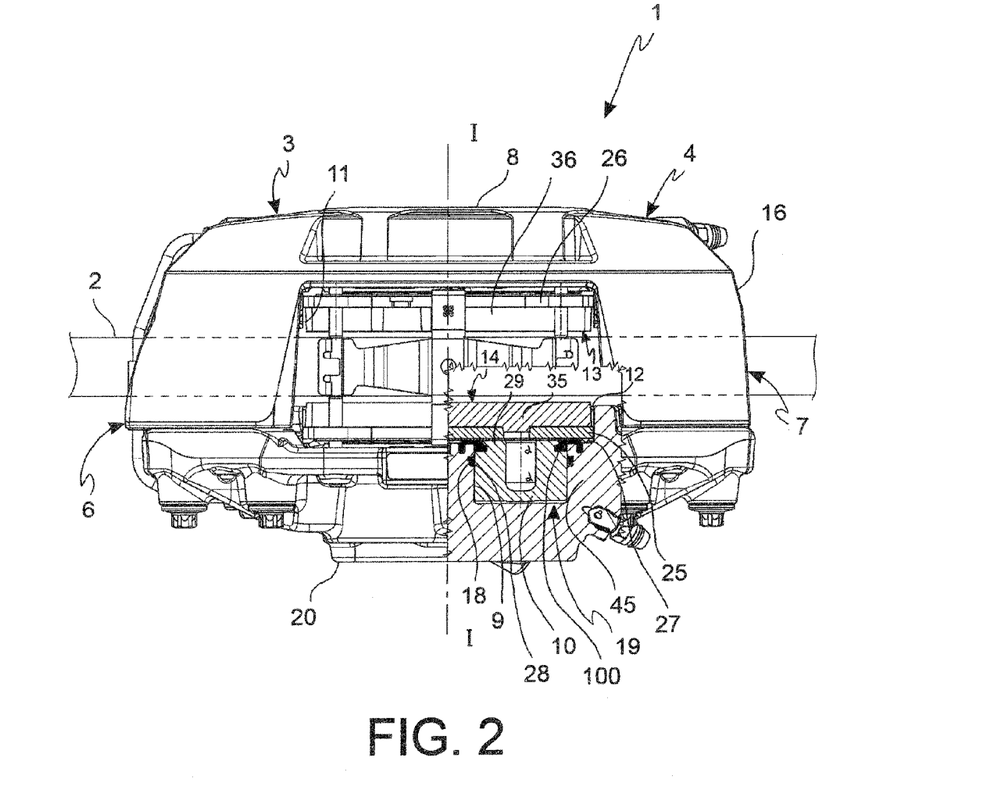
FIG. 2 is a partially sectional plan view of a disc brake according to the invention.
Figure 3:
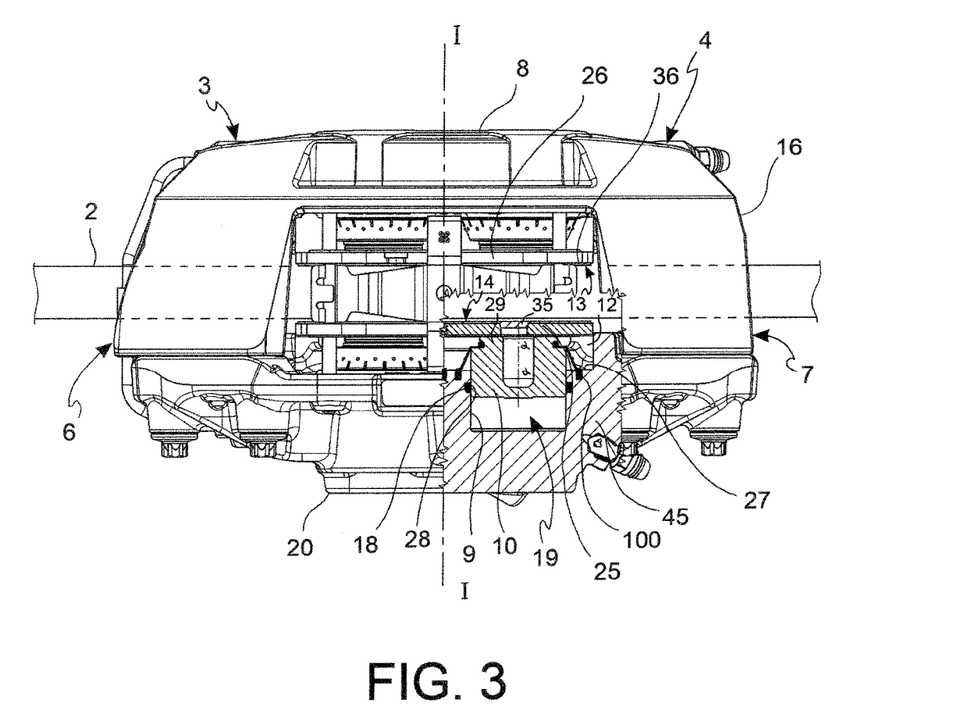
FIG. 3 is a further partially sectional plan view of a disc brake according to the invention with piston during a different operating condition than in FIG. 2.

In FIGS. 1, 2 and 3 a disc brake 1 is shown which is suitable to act on a braking band of a disc 2, particularly for a motor vehicle, not illustrated.

According to the particular example illustrated in FIG. 1, the disc brake 1 is of the fixed-caliper type however the present invention can be also applied to different types of disc brakes, such as for example floating caliper disc brakes.

The disc brake 1 comprises a disc 2, suitable to be associated with a wheel of the motor vehicle, and a caliper 3 including a caliper body 4.

The caliper body 4, suitable to be fixed to a splinder of the motor vehicle suspension, comprises first and second half half body 16,40 facing each other and arranged on opposite parts relative to the brake disc.

The two half bodies 16,40 can be associated with each other by means of threaded connecting means, or the caliper body can be made as one piece.

The caliper body 4 has a first bridge element 6 and a second bridge element 7, which are substantially U-shaped, arranged astride the disc 2, and on the right and on the left of an axis I-I of the disc brake 1, respectively. Furthermore, within the caliper body 4 two housing seats 11 and 12 are formed for respective pads 13 and 14. The pads 13 and 14 comprise relevant support plates 25 and 26 for corresponding fiction gaskets 35 and 36.

In the example embodiment described above, each of the two half bodies 16,40 of the caliper body 4 includes two piston-cylinder units 19, only one of them being visible in FIGS. 2 and 3. Each piston-cylinder unit 19 comprises a portion 45 that innerly defines a hydraulic cylinder 9 of axis a-a and having an opening 27 facing the seat 12, and a piston 10 having a head 29, that can axially slide within the cylinder 9 such as to be active on the pad 14.

In agreement with an embodiment, said piston 10 has a piston outer surface suitable to co-operate with a cylinder inner surface 9 of the caliper body 4 which accommodates the piston, said outer surface having a predefined piston diameter Dp and said cylinder inner surface 9 having a predefined cylinder diameter Dc.

In agreement with an embodiment, the cylinder-shaped piston 10 has a piston diameter Dp defining the distance between the outer surfaces thereof along a straight line intersecting the axis thereof and perpendicular to the axis. Similarly, the cylinder 9 has a cylinder diameter Dc defining the distance between the outer surfaces thereof along a straight line passing through the axis a-a thereof and perpendicular to the axis a-a.

Channels are provided within the caliper body 4 in an entirely conventional manner for the brake fluid to be supplied to the to the cylinder 9. The cylinder 9 is provided with an annular groove 18 for a tight-seal gasket 28, of a conventional type.

Furthermore, the piston-cylinder unit 19 is provided with a flexible sheathing 100 for the protection of the cylinder 9 and piston 10 (particularly, of the respective sliding surfaces) from the infiltration of any external material and/or corrosive agents.

In agreement with an embodiment, the sheathing 100, in the retracted condition, is disc-shaped and develops from an inner diameter Di to an outer diameter De.

In agreement with an embodiment, the outer diameter De of the sheathing 100 is greater than the cylinder diameter Dc and the inner diameter Di of the sheathing 100 is lower than the piston diameter Dp.

This flexible sheathing 100 has a bellows-type shape and is such as to have a wrapped configuration comprising one or more folds or loops when it is at rest or when the piston 10 to which it is connected is within the cylinder 9. Furthermore, the flexible sheathing 100 can elongate until it takes a substantially cylindrical or truncated-cone shape, when the piston 10 extends outside from the cylinder 9 towards the disco 2.

Figure 4:
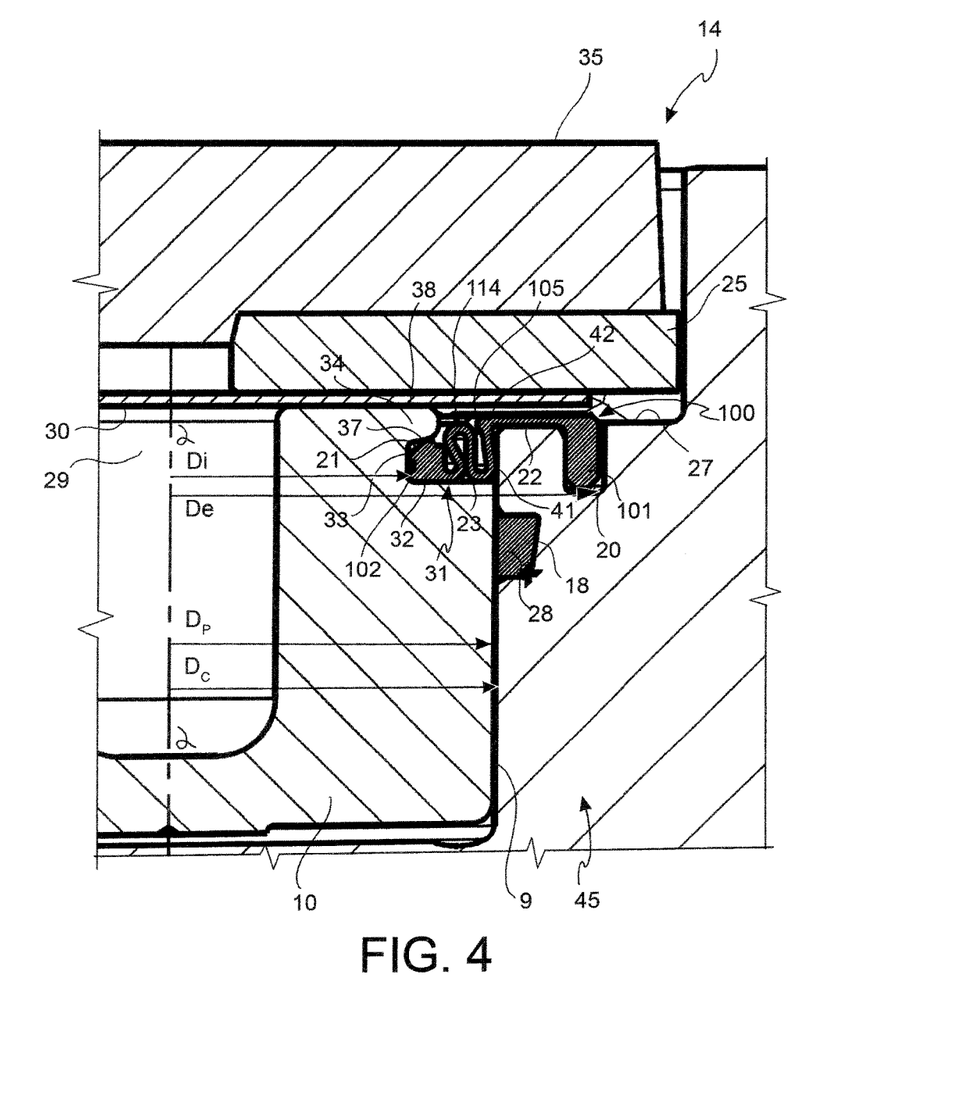
FIG. 4 is an enlarged portion of the disc brake in FIG. 2.
Figure 5:
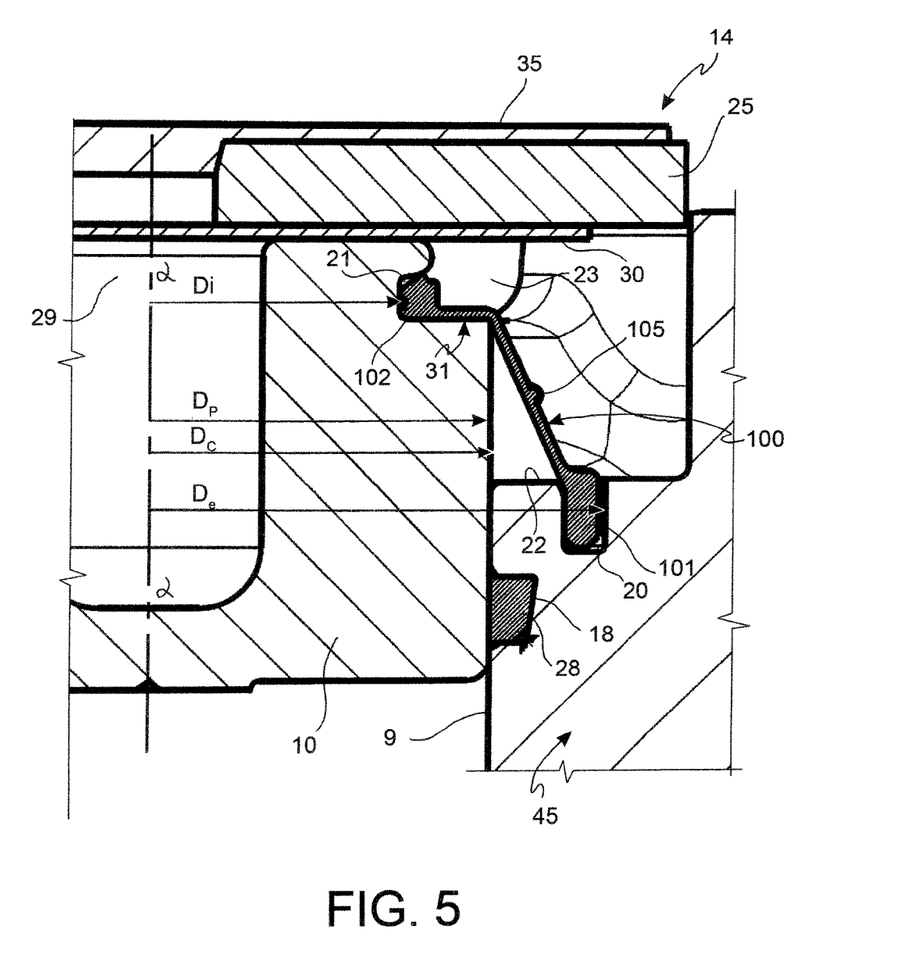
FIG. 5 is an enlarged portion of the disc brake in FIG. 3.

Particularly, in a condition in which the pads 13 and 14 are new, i.e. when the friction gaskets 35, 36 are not worn (such as shown in FIG. 4 by way of example), the flexible sheathing 100 takes the wrapped configuration whereas it stretches when the piston 10 extends as a consequence of the wear of the friction gaskets 35, 36. FIG. 5 shows a portion of the disc brake of FIG. 3 in a condition where the piston 9 is projected forwards as a consequence of an almost complete wear of the friction gaskets 35, 36. It should be observed that, in the illustration in FIG. 5 the flexible sheathing 100 is extended in a rectilinear manner between the two anchoring points thereof in the cylinder 9 and in the piston 10 but, in the condition of leant-forward piston 9, the flexible sheathing 100 can also be extended by having, for example, an undulated configuration.

Figure 6:
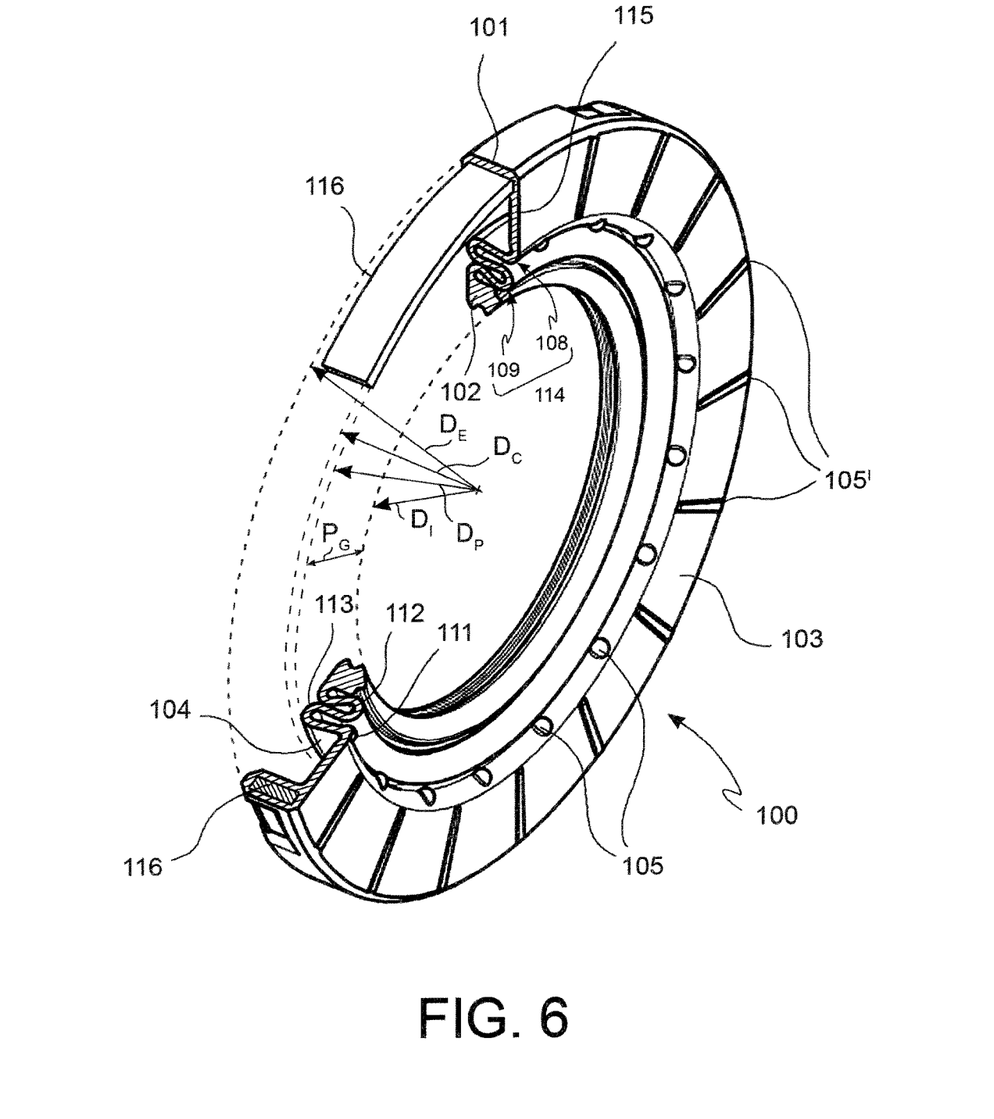
FIG. 6 is an axonometric view of a flexible sheathing according to the invention.
Figure 7:
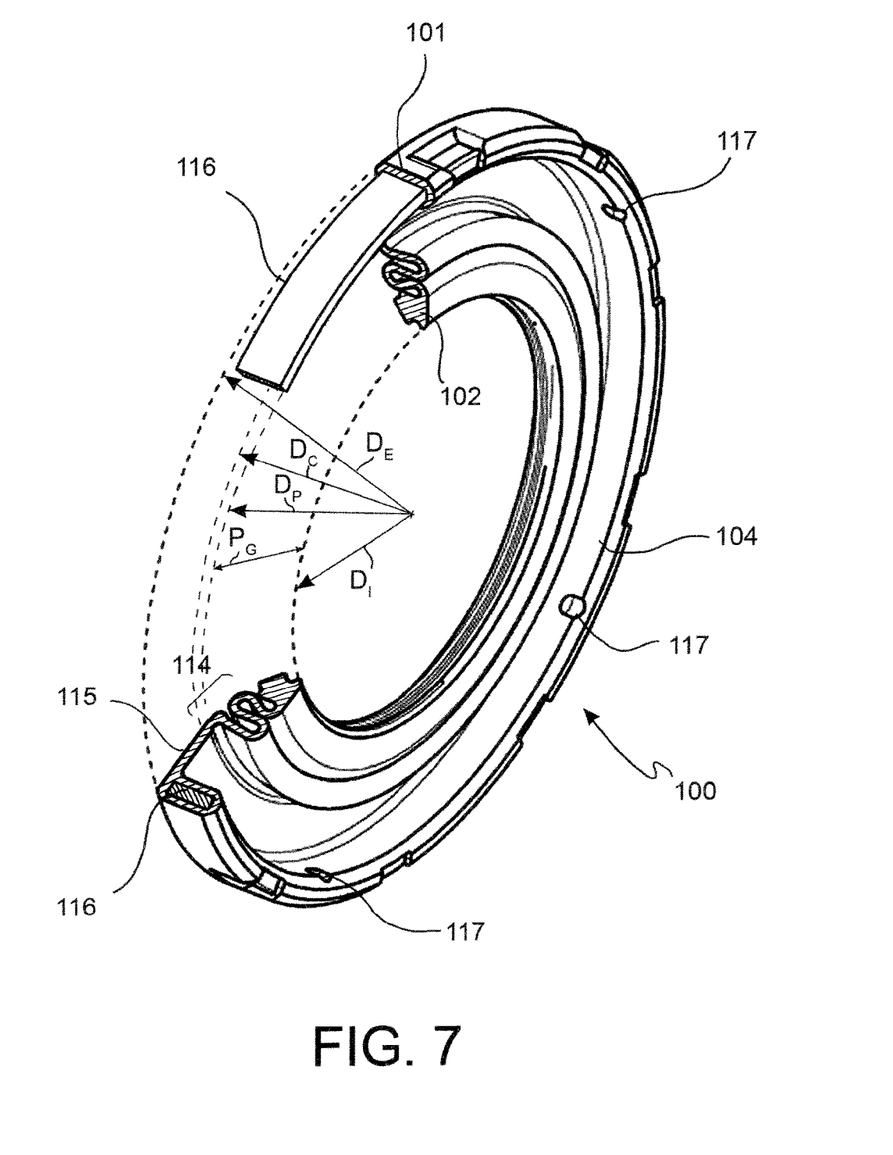
FIG. 7 is a further axonometric view of the flexible sheathing of FIG. 6.

In FIGS. 6 and 7 a partially sectional view of the flexible sheathing 100 is shown when the latter is in the wrapped configuration.

The flexible sheathing 100 has, at an end thereof, a first annular region or a first hooking ring 101 which is intended to be fixed to the portion 45 that defines the cylinder 9, and at an opposite end, a second annular region or second hooking ring 102 intended to be fixed to the piston 10.

In order to allow fixing the flexible sheathing 100, the portion 45 is provided, at the opening 27, with a groove 20 to accommodate the first ring 101 and the piston 10 is provided, at the head 29, with a groove 21 to accommodate the second ring 102. For example, the hooking rings 101 and 102 have a thickness and a shape such as to be capable of being engaged within the 20 and 21, which have such a shape as to ensure the fixing of the flexible sheathing 100. In any case, any other suitable means for fixing the flexible sheathing 100 to the piston-cylinder unit 19 can be used.

Furthermore, within the portion 45, at the opening 27, an optional annular housing 22 has been provided to accommodate at least part of the flexible sheathing 100 when the latter is in the wrapped up configuration.

The flexible sheathing 100 has an outer surface 103 and an inner surface 104 and comprises a plurality of portions with concentric annular bands which are joined to each other and having diameters of various sizes.

In agreement with an embodiment, the flexible sheathing comprises a joining band 115 connecting the first hooking ring 101 and a plurality of folds 114 of the sheathing 100.

In agreement with an embodiment, the second hooking ring 102 has a section along a radial plane intersecting the axis a-a of the cylinder 9 comprises several projections which are such as to contact the groove 21 of the piston.

Advantageously, the projections of the second hooking ring 102 allow reducing the surface in contact with the piston such as to reduce the heat transmission to the sheathing and thereby prolonging the life cycle of the latter.

In agreement with an embodiment, the plurality of folds 114 makes up the extensible part of the sheathing 100 in order to let the latter to be extended along with the piston 10 when the latter is extended outwards of the cylinder 9.

Particularly, the joining band 115 is intended to be accommodated within the seat 22 and radially arranged, i.e. such as to lay in a plane substantially orthogonal to the axis a-a of the cylinder 9 when the flexible sheathing 100 is applied to the piston-cylinder unit 19.

This joining band 115 joins the first hooking ring 101 to a first fold 108 of the plurality of folds 114.

This first fold 108 is connected to a second fold 109 connected to the second hooking ring 102.

In agreement with an embodiment, the first and second folds 108,109 have a U-shaped section, along a radial plane intersecting the axis a-a of the cylinder 9, such as to the portions making up this fold folded in a way as to directly face each other.

In agreement with an embodiment, the first and second folds 108,109 have portions that are substantially folded by 180° relative to each other.

In agreement with an embodiment, the folds of the plurality of folds 114 are formed by portions of said sheathing body that are folded in a way as to have the surfaces thereof directly facing each other and such as to allow the extension of the sheathing 100 during the outwards movement of the piston 10 from the cylinder 9 of the caliper body 4.

The folds are folded such that the outer surface 103 of the sheathing 100 directly faces the fold portion of inner surface 104.

The first and second folds 108 and 109 have two annular convexities 111 and 112, respectively, which are joined to each other by an annular concavity 113.

It should be observed that one or more portions of the outer surface 103 can be caused to face the pad 14, i.e., these portions result to face this pad, and particularly, a wall 30 of the plate 25, when the flexible sheathing 100 is applied to the piston-cylinder unit 19. Particularly, as shown in FIG. 4, the annular convexities 111 and 112 can be caused to face the pad 14.

Advantageously, the flexible sheathing 100 is provided with at least one spacer element 105,105' which allows holding at least one portion of the surface 103 suitably spaced from pad 14, and particularly from the wall 30 of the plate 25.

In the example of the figures, the spacer elements 105 are arranged at the annular convexities 111 and joining band 115.

Advantageously, the spacer elements 105 are intended to contact the wall 30 by being interposed between the outer surface 103 and the plate 25 thereby avoiding a direct contact between the latter and portions of the flexible sheathing 100 such as, for example, the annular convexity 111 and the joining band 115 and thereby allowing to reduce the heat exchange between the pad 14 and the flexible sheathing 100 resulting from a braking action.

In agreement with an embodiment, the spacer elements 105 comprise further spacer elements 105' which are arranged on the joining band 115 in the form of protuberances provided on the outer surface 103 of the sheathing 100 arranged on the joining band 115.

In agreement with an embodiment, these further spacer elements 105' are in the shape of rectilinear protuberances having a radial direction and spaced from each other, which are arranged on the surface of the joining band 115.

Advantageously, the spacer elements 105 arranged on the joining band 115 ensure rigidity of the latter by ensuring the planarity of the surfaces thereof in addition to the above-mentioned advantage of avoiding the direct contact of the joining band with the pad 14.

In agreement with an embodiment, these spacer elements 105 are projections provided in the sheathing 100 and can have various shapes. At this regard, it should be understood that in agreement with an embodiment those shapes that minimize, ideally to a point, the contact surface between these protuberances and the wall of the plate 25 are particularly suitable to the purpose. In FIG. 6, the spacer elements 105 positioned on the annular convexity 111 are protuberances substantially having the shape of a spherical dome, whereas the spacer elements 105 positioned on the joining band 115 are protuberances arranged on the surface 103 of this band 115 in the radial direction which are suitably spaced from each other.

In agreement with an embodiment, the sheathing 100 can comprise spacer elements 105 positioned only on the joining band 115 such as to space the latter from the pad 14 and avoid the sheathing from being damaged. On the other hand, the remaining part of the sheathing 100 results to be already spaced from the heat source in that it is accommodated within a seat of the piston 10, as described below.

However, other shapes can be used than those shown herein, such as truncated pyramid shapes or of irregular section (which develop mainly in one or more direction).

The flexible sheathing 100, provided with the spacer elements 105, can be obtained in a conventional manner, for example, by means of injection of a melted material into a mold provided with cavities reproducing the sheathing in a wrapped configuration in negative. The materials that can be used for making the flexible sheathing 100 typically are of a type resisting to the brake fluid and temperatures to which the sheathing can be subjected. Preferably, upon increase in the temperatures that can be reached during the braking, in order to make the flexible sheathing 100 SBR (styrene-butadiene rubber), EPDM (ethylene-propylene-diene ter-polymer) or silicon rubbers, as well as NBR rubbers (buta-diene-acrylonitrile) can be used, in the above-mentioned order, for uses in environment where mineral oil is present.

As mentioned above, the flexible sheathing 100 is shaped such that, when it is at rest, it takes the same wrapped configuration as when it is applied to the piston-cylinder unit 19 in case of new pads 13 and 14.

In agreement with an embodiment, with reference to FIG. 4, the piston 10 comprises a sheathing housing 31 arranged as an annular groove of the same piston comprising the groove 21 that accommodates the second hooking ring 102.

This sheathing housing 31 is such as to accommodate substantially the entire protective sheathing 100 when it is in the retracted position within said groove.

In agreement with an embodiment, this sheathing housing 31 is arranged on the head 29 of the piston 10 such as to accommodate the first fold 108, the second fold 109, making up the plurality of folds 114, and the second hooking ring 102.

In agreement with an embodiment, the sheathing housing 31 accommodates the portion of protective sheathing 100 which comprises those lengths that are mutually folded on themselves such as to face substantially each other and be suitable to allow the sheathing 100 to be extended in such a way as to protect the piston-cylinder unit 19 even when the piston 10 is extended.

By the expression sheathing lengths 100 folded such as to directly face each other is meant that they face each other without any other material portion being interposed therebetween, for example of the piston 10 or caliper body 4.

In other words, the sheathing housing 31, in condition of retracted sheathing, comprises the entirety of the sheathing portions 100 that are folded on each other such that the outer surface 103 of the sheathing 100 faces the inner surface 104 of the sheathing 100.

In agreement with an embodiment, the plurality of folds 114 is totally arranged on the sheathing portion extending from the inner diameter Di to the piston diameter Dp and said plurality of folds 114 is suitable to be accommodated within a seat provided in the pressing head 29 of the piston 10.

In agreement with an embodiment, this sheathing housing 31 comprises a lower surface 32 facing the pad 14 and substantially perpendicular to the axis a-a of the piston 10 extending from the outer surface of the piston 10 facing the cylinder 9 to the groove 21.

Furthermore, said sheathing housing 31 comprises a bottom surface 33, which also is the bottom surface of the groove 21, which is arranged perpendicularly to the lower surface 31, and starting from the latter, it ends at the intersection with a hooking protuberance 34 of the groove 21.

In agreement with an embodiment, this hooking protuberance 34 projects from the bottom surface 33 perpendicularly from the axis a-a of the piston 10 partially within the sheathing housing 31.

Particularly, the hooking protuberance 34 comprises a hooking surface 37 facing the groove 21 and an opposite abutment surface 38 which is a portion of the surface of the head 29 of the piston 10 which abuts against the pad 14.

In agreement with an embodiment, the sheathing housing 31 comprises housing walls and a first opening 41 facing the cylinder 9 and a second opening 42 facing the pad 14, such as to be capable of accommodating the sheathing 100 and allowing the latter to pass through the groove 20 of the cylinder 9 in which the first hooking ring 101 is arranged to the groove 21 of the piston 10 in which the second hooking ring 102 is arranged.

In agreement with an embodiment, in the condition of retracted sheathing 100, the joining band 115 of the sheathing 100 is accommodated within a annular housing 22 of the caliper body 4 defining the cylinder 9 such as to be extended substantially perpendicular to the axis a-a of the piston 10, the first hooking ring 101 is accommodated within the first seat 20 of the cylinder 9 and the remaining part of the sheathing 100 is accommodated within the sheathing housing 31 of the piston 10.

In agreement with an embodiment, the sheathing housing 31 comprises a fold seat 23, that entirely accommodates the plurality of folds 114, which seat is opened on two sides of which one is suitable to face the pad 14 and further suitable to face the cylinder 9 when the piston 10 is completely accommodated within the cylinder 9, and the housing 31 further comprises the groove 21 of the undercut caliper body 4 opened on one side only which faces the first fold seat 23 and suitable to contain the second hooking ring 102 of the sheathing 100.

Advantageously, the arrangement of the sheathing housing 31 within the piston 10 allows reducing the overall dimension of the caliper assembly because the arrangement of suitable seats between the piston-cylinder and the pads is not required since the sheathing 100 is completely accommodated within said sheathing housing 31.

Advantageously, due to the arrangement of the sheathing housing 31 within the piston 10 one can avoid increasing the distance between the opening 27 of the cylinder 9 facing the pad 14 and the pad 14 such that this distance is substantially the same being used with calipers for disc brakes which do not use the protective sheathing 100.

Advantageously, due to the arrangement of the sheathing housing 31 within the piston 10 the provision of a seat within the cylinder 9 to accommodate the retracted sheathing 100 can be avoided such as to avoid the weakening of the resistant section of the cylinder and accordingly of the caliper body which would reduce the stiffness thereof and, hence, the performance thereof.

Advantageously, in order to avoid that the sheathing housing 31 may reduce the mechanical characteristics of the piston 31, the latter can be made of a material having higher mechanical characteristics such that the piston efficiency is the same with the size being equal regardless of the provision of housing 31.

Particularly, the material used to make the piston can be other than the material used to make the caliper body 4, thereby using a material with higher mechanical characteristics and hence more expensive only when it is required.

In agreement with an embodiment, the protective sheathing 100 comprises vents 117 arranged along the first primo hooking ring 101 such as to allow the air to flow out during the installation of the protective sheathing 100 on the piston-cylinder unit 19.

In agreement with an embodiment, the vents 117 are in the shape of semi-cylindrical seats with an axis parallel to the axis a-a of the piston 10 which are arranged on the inner surface 104 of the first hooking ring 101.

In other words, this vents 117 are arranged on the surface of the first hooking ring 101 suitable to abut within the groove 21 of the cylinder 9.

In agreement with an embodiment, the first hooking ring 101 comprises a metal hoop reinforcement 116 arranged within the first hooking ring 101 such as to ensure stiffness, mechanical resistance and shape to the dust cover sheathing 100.

Particularly, the metal hoop reinforcement 116 results to be dipped within the material making up the protective sheathing 100 and particularly the material making up the first primo hooking ring 101.

Advantageously, this metal hoop reinforcement 116 facilitates the hooking of the sheathing 100 to the cylinder 9 and ensures the proper positioning of the sheathing for the entire life cycle thereof thereby avoiding any warping of the latter when it is subjected to the heat deriving from the operation of the disc brake.

To the embodiments of the device described above, those skilled in the art may, in order to meet contingent requirements, carry out modifications, adaptation and replacements of elements with others functionally equivalent, without departing from the scope of the following claims. Each of the characteristics described as belonging to a possible embodiment can be carried out independently of the other embodiments described herein.

For example, a flexible sheathing 100 for the protection of a piston-cylinder unit for a disc brake that can be arranged with an end thereof being fastened to the piston body 4 defining the cylinder 9 and with the opposite end to the piston 10 such as to avoid that foreign particles may enter the piston-cylinder interface, wherein in a retracted condition the piston 10 is completely accommodated within the cylinder 9 and in an extended condition the piston 10 is completely extracted from the caliper body 4 defining the cylinder 9, said piston 10 having an outer cylindrical surface facing a corresponding surface of the cylinder 9 and a surface making up an end of the cylindrical surface suitable to press against a pad 14, where this outer cylindrical surface of the piston and this end surface define a piston overall dimension volume of a substantially cylindrical shape, this sheathing 100 comprising:

a substantially disc-shaped sheathing body 100 which extends from an inner Di to an outer De diameter;

a first hooking ring 101 arranged along the outer diameter De of the sheathing 100 suitable to be fixed to a caliper body 4;

a second hooking ring 102 arranged along the remaining inner diameter Di of the sheathing 100 suitable to be fixed to the piston 10;

a plurality of folds 114 being formed by folds being defined by portions of said sheathing body folded such as to have the surfaces thereof directly facing each other and such as to allow the extension of the sheathing 100 during the outwards movement of the piston 10 from the cylinder 9 of the caliper body 4;

Characterized in that:

said plurality of folds 114 is totally arranged on that sheathing portion which is suitable to be arranged within the overall dimension volume of the piston when the latter is in the retracted position.

The invention claimed is:

1. A caliper for a disc brake comprising a piston accommodated with a cylinder of a caliper body of the disc brake to press on a braking pad, said piston having a piston outer surface co-operating with a cylinder inner surface of the caliper body which accommodates the piston, said outer surface having a predefined piston diameter and said cylinder inner surface having a predefined cylinder diameter, wherein said piston comprises a piston body and a head thereof which can press against the pad, the caliper comprising:
   a sheathing housing arranged on the head of the piston having housing walls and a first opening which directly faces the cylinder and a second opening which directly faces the braking pad,
   a flexible sheathing for protecting a piston-cylinder unit for a disc brake which is movable between a retracted condition and an extended condition,
   wherein the flexible sheathing comprises:
   a sheathing body extending radially from an inner diameter to an outer diameter and defining an axial direction, a radial direction orthogonal to the axial direction and a circumferential direction; said sheathing body comprising:
   a first hooking ring arranged along the outer diameter of the sheathing which projects in the axial direction and is fixed to a caliper body;
   a second hooking ring arranged along the inner diameter of the sheathing which projects in the axial direction and is fixed to the piston;
   a sheathing portion extending from said inner diameter;
   a plurality of folds connected to and extending radially outward from said second hooking ring and consisting of side by side folds defined by portions of said sheathing body that are folded with adjacent surfaces of the plurality of folds directly facing each other and to facilitate extension of the sheathing and flattening of the plurality of folds during the outward movement of the piston from the cylinder of the caliper body, said plurality of folds being totally arranged on said sheathing portion which extends from the inner diameter;
   said body comprising a joining band connecting the first hooking ring to the plurality of folds, said joining band extending in a substantially planar manner in the radial direction in the shape of a disc;
   wherein:
   the plurality of folds extends in the radial direction by a predetermined first extension or radial extension of folds;
   the joining band extends in the radial direction by a predetermined second extension or radial extension of joining band;
   wherein the size of said predetermined second extension is equal to or greater than said predefined first extension,
   wherein the sheathing housing comprises a fold seat formed in the head of the piston, that entirely contains the plurality of folds, said fold seat having a lower surface and being opened on two sides of which one of the sides is configured to face both the pad and the cylinder when the piston is completely accommodated within the cylinder,
   wherein the sheathing housing further comprises a protuberance extending radially outward to define a first annular groove formed in the fold seat proximate the lower surface and extending away from the cylinder, the first annular groove opening radially outward, wherein the second hooking ring of the flexible sheathing mounts in the first annular groove, the second hooking ring being radially inward and proximate the plurality of folds; and wherein the piston comprises a different material comprising the caliper body which forms the cylinder of the piston-cylinder unit
   wherein the caliper body defining the cylinder comprises a second annular groove, the second annular groove having an opening transverse to a radial direction and an annular outer wall and a parallel annular inner wall, the second annular groove receiving the first hooking ring, the first hooking ring engaging the annular outer wall and the annular inner wall of the second annular groove and forming a radially extending edge at the opening of the second annular groove, the joining band extending radially inward from the first hooking ring from the radial edge of the first hooking ring at the opening of the second annular groove.

2. The caliper for a brake of claim 1, wherein in a condition of retracted sheathing, the joining band of the sheathing is accommodated within an annular housing of the caliper body defining the cylinder so that the joining band extends substantially perpendicular to the axis of the piston, the first hooking ring being accommodated within a first seat of the cylinder and the remaining part of the sheathing being accommodated within the sheathing housing of the piston.

3. The caliper for a disc brake of claim 1, wherein
   said plurality of folds of the sheathing extends in the axial direction by a predetermine third extension or axial extension of folds;
   said first hooking ring extends in the axial direction of a predetermined fourth extension or axial extension of the first hooking ring; and wherein the size of said predetermined fourth extension is equal to or greater than said predetermined third extension.

4. The caliper for a disc brake of claim 1, wherein the flexible sheathing comprises at least one spacer element projecting outward from a surface of the joining band.

5. The caliper for a disc brake of claim 4, wherein the at least one spacer element projects outward at the annular convexities of the joining band.

6. The caliper for a disc brake of claim 4, wherein the spacer elements engage a wall of a plate of the braking pad and hold an outer surface of the joining band spaced from the braking pad.

7. The caliper for a disc brake of claim 4, wherein the spacer elements comprise rectilinear protuberances having a radial direction and spaced from each other on the surface of the joining band.

8. The caliper for a disc brake according to claim 1, wherein the joining band extends radially inward across an annular housing radially interior of the second annular groove.

9. The caliper for a disc brake according to claim 1, wherein the first hooking ring substantially fills the second annular groove.

\* \* \* \* \*

UNITED STATES PATENT AND TRADEMARK OFFICE
CERTIFICATE OF CORRECTION

PATENT NO. : 10,378,598 B2
APPLICATION NO. : 13/808256
DATED : August 13, 2019
INVENTOR(S) : Scotti et al.

It is certified that error appears in the above-identified patent and that said Letters Patent is hereby corrected as shown below:

On the Title Page

Item (30) Foreign Application Priority Data: "Jul. 5, 2010 (IT) MI2010A1233" should read -- Jul. 5, 2010 (IT) MI2010A001233 --

Signed and Sealed this
Twelfth Day of November, 2019

Andrei Iancu
*Director of the United States Patent and Trademark Office*